United States Patent [19]

Gaines

[11] Patent Number: 5,036,705

[45] Date of Patent: Aug. 6, 1991

[54] ACCELEROMETER DAMPED WITH SELF CONTAINED VISCOUS MATERIAL

[75] Inventor: Donald J. Gaines, Eleroy, Ill.

[73] Assignee: Honeywell Inc., Minneapolis, Minn.

[21] Appl. No.: 445,589

[22] Filed: Nov. 29, 1989

[51] Int. Cl.$^5$ .................... B60R 21/10; A62B 35/02
[52] U.S. Cl. ............................ 73/517 AV; 73/515; 73/DIG. 3
[58] Field of Search .............. 73/515, 516 R, 517 AV, 73/526, DIG. 3, 651

[56]  References Cited

U.S. PATENT DOCUMENTS

| | | | |
|---|---|---|---|
| 3,113,223 | 12/1963 | Smith et al. | 310/8.5 |
| 4,561,299 | 12/1985 | Orlando et al. | 73/151 |
| 4,638,669 | 1/1987 | Chou | 73/517 R |
| 4,849,655 | 7/1989 | Bennett | 307/309 |
| 4,996,540 | 2/1991 | Motoi et al. | 346/108 |

FOREIGN PATENT DOCUMENTS 3342186  5/1985  Fed. Rep. of Germany .... 73/517 R

OTHER PUBLICATIONS

Harris and Crede, Authors, Shock and Vibration Handbook Volumes I-III, 1961, McGraw-Hill publisher, chap. 35, pp. 7-10, chap. 32, pp. 20-21, chap. 37, pp. 29-30.

Primary Examiner—Hezron E. Williams
Assistant Examiner—Craig Miller
Attorney, Agent, or Firm—Charles L. Rubow

[57] ABSTRACT

A damping arrangement for a deflectable beam accelerometer where the deflectable end of the beam is spaced from a stationary member. A drop of self contained viscous material extends between the deflectable end and the stationary member to dampen movement of the deflectable end.

13 Claims, 1 Drawing Sheet

ACCELEROMETER DAMPED WITH SELF CONTAINED VISCOUS MATERIAL

BACKGROUND

The invention disclosed herein relates generally to accelerometers and more particularly to a damping arrangement for cantilever beam type accelerometers used for relatively low acceleration levels at relatively low frequencies. Applicant's invention has been found to be particularly applicable to acceleration levels below 2 g's and frequencies below 50 Hz, where 1 "g" is equal to the acceleration of the earth's gravity at its surface.

In the past accelerometers have used a fluid such as oil to achieve damping by locating the accelerometer within a cavity and filling the cavity with oil. The oil then slows or damps the movement of the inertial element of the accelerometer and provides the desired damping effect. The manufacturing processes associated with providing and maintaining oil filled cavity devices and the effects of ambient temperature variation on the oil and upon the accelerometer performance make oil filled cavities undesirable for many accelerometer applications.

Thus a need exists for an accelerometer damping arrangement that does not require the use of an oil filled cavity and provides substantially uniform performance under varying ambient temperatures.

SUMMARY OF THE INVENTION

The present invention solves these and other needs by providing a damping arrangement for an accelerometer having a stationary member and an inertial member spaced from and movable with respect to the stationary member. The damping is provided by a drop of self contained viscous material bridging the gap between the stationary and the inertial members. In one embodiment the inertial member is a cantilever beam with the deflectable end carrying a magnet and with a Hall chip located on the stationary member for providing a signal representative of the movement of the magnet. The deflectable end of the inertial member may be configured with two legs extending toward the stationary member, the two legs being partially immersed in two portions of silicone gel deposited on the stationary member.

DESCRIPTION

Figure 1:
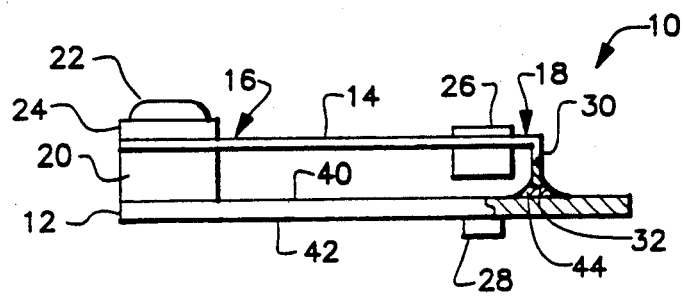
FIG. 1 is a side elevation view of an accelerometer in accordance with the applicant's invention shown partially broken away to better reveal the damping feature embodied therein.
Figure 2:
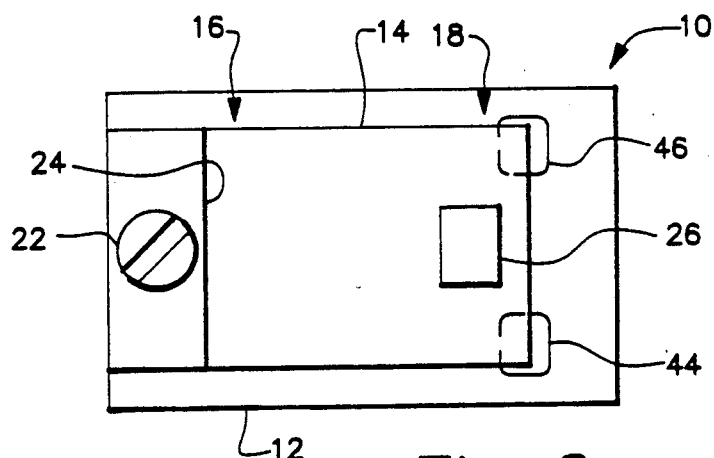
FIG. 2 is a plan view of the accelerometer of FIG. 1.
Figure 3:
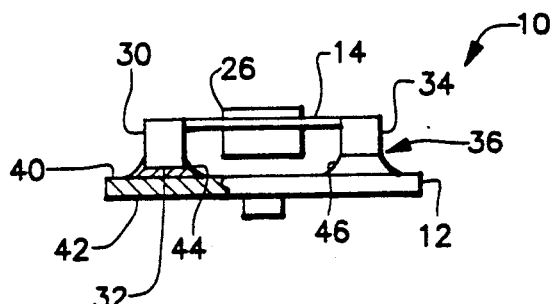
FIG. 3 is an end elevation view of the accelerometer of FIG. 1.

In FIGS. 1-3, reference numeral 10 identifies an accelerometer having a damping arrangement in accordance with applicant's invention. As shown in these features, accelerometer 10 includes a stationary member or substrate 12 and a deflectable cantilever beam 14. Beam 14 has a fixed end 16 spaced from substrate 12 by support block 20, and a deflectable end 18. Beam 14 is secured to support block 20 by screw 22 through clamping piece 24. Beam 14 can be of spring type stainless steel or other suitable material.

Magnet 26 is secured to deflectable end 18 of beam 14. Preferably a rare earth type magnet will be used to provide a very high flux density, but other types of magnets could be used. An opening cut in the beam with extending tabs may be used in combination with epoxy to secure magnet 26 to beam 14, or other means can be used.

Well known thick film processing techniques are used to screen resistors and interconnects onto lower surface 42 of substrate 12 as needed for the electronics to support a magnetic field sensor. A magnetic field sensor or Hall chip 28 is mounted to lower surface 42 so that the Hall chip is in alignment with magnet 26.

A damping arrangement in accordance with the present invention preferably utilizes a silicone gel as a damping material, although other self contained viscous materials having suitable characteristics may also be used. For example certain silicone oils may be suitable in some applications. For purposes of the present application, self contained means having the property of retaining a predetermined shape under all expected environmental conditions without the requirement for a confining container.

Silicone gel known as SYLGARLD TM 527 primerless silicone dielectric gel commercially available from Dow Corning Corporation has been found to be a very satisfactory damping material. This is a two component silicone encapsulant that cures to form a cushioning, self-healing, resilient, gel like mass. The cured gel retains much of the stress relief and self healing qualities of a liquid, while developing much of the dimensional stability and non-flow characteristics of a solid elastomer. After curing, the physical properties of resistance to penetration and volumetric expansion are insensitive to the normal changes in ambient temperature and other environmental parameters.

Deflectable end 18 of beam 14 includes a first depending leg 30 extending toward substrate 12 and terminating in end 32 and a second depending leg 34 extending toward substrate 12 and terminating in end 36. Legs 30 and 34 are preferably spaced apart. End 32 and end 36 are spaced from substrate 12 by a predetermined distance.

A first portion or drop 44 of silicone gel is deposited between end 32 and upper surface 40 of substrate 12 and a second portion or drop 46 is deposited between end 36 and upper surface 40. The silicone gel will adhere to substrate 12 and legs 30 and 34. A hypodermic needle or the like may be used for depositing the silicone gel. The silicone gel may be allowed to cure at room temperature or the curing may be accelerated through the use of an oven.

In one satisfactory model of the applicant's invention the displacement of the deflectable end 18 of cantilever beam 14 at acceleration levels below 2 g's and frequencies below 50 hertz was estimated to be of the order of 0.001 inch in either direction relative to the 0 g acceleration position of the beam. With this amount of deflection satisfactory results were obtained and the accelerometer output was relatively flat over the desired operating range of frequencies when depending legs 30 and 34 were immersed to a depth of approximately 0.004 to 0.005 inches in first portion 44 and second portion 46 respectively of silicone gel. The model had a natural resonant frequency of approximately 250 hertz.

The damping effect apparently results from the deforming of the gel by the movement of legs 30 and 34 and the rubbery or elastic property of the gel which causes it to resiliently return to its original shape or form. The amount of damping can therefore be varied somewhat by varying the width of depending legs 30 and 34 and the quantity of gel used. For example, increasing the width of the depending legs increases the leg surface area immersed in the gel and quantity of gel that is deformed by movement of the legs, thereby increasing the damping effect of the gel. It will also be appreciated that other variations in the shape or form of the legs will vary the damping action. Similarly the depth of immersion of the legs in the gel may be varied to vary the damping effect.

In accordance with the foregoing description, applicant has developed a simple damping arrangement that is easily incorporated into the design of conventional deflectable beam accelerometers. Although a specific embodiment of the applicant's damping arrangement is shown and described for illustrative purposes, a number of variations and modifications will be apparent to those of ordinary skill in the relevant arts. It is not intended that coverage be limited to the disclosed embodiment, but only by the terms of the following claims.

I claim:

1. An accelerometer, comprising:
    a stationary member;
    an inertial member movable relative to the stationary member in response to acceleration, the inertial member spaced from the stationary member;
    means for detecting movement of the inertial member relative to the stationary member; and
    a self contained viscous gel extending between the inertial member and the stationary member for damping movement of said inertial member.

2. The accelerometer of claim 1 wherein:
    the inertial member is a cantilever beam having a deflectable end; and
    the self contained viscous gel is a silicone gel extending between the deflectable end of the cantilever beam and the stationary member.

3. The accelerometer of claim 2 wherein the deflectable end of said cantilever beam is configured with a first depending leg extending toward the stationary member, a portion of the first depending leg being immersed in the silicone gel.

4. The accelerometer of claim 3 wherein the silicone gel is of a type which cures in place to form a cushioning, resilient gel-like mass which adheres to the stationary member.

5. The accelerometer of claim 4 wherein the deflectable end of said cantilever beam is configured with a second depending leg extending toward the stationary member, a portion of the second depending leg being immersed in the silicone gel.

6. The accelerometer of claim 5 wherein said means for detecting movement of the inertial member relative to the stationary member comprises:
    a magnet carried by the deflectable end of said cantilever beam; and
    a Hall chip located on said stationary member for providing a signal representative of the movement of the magnet.

7. The accelerometer of claim 6 wherein the first and second depending legs are immersed in the silicone gel to a depth of from 0.004 to 0.005 inches.

8. An accelerometer, comprising:
    a stationary member;
    a deflectable cantilever beam having a fixed end and a deflectable end, the deflectable end being spaced from the stationary member;
    a magnet secured to the cantilever beam at a location spaced from the fixed end;
    a magnetic field detector located for detecting movement of the magnet relative to the stationary member; and
    a self contained viscous damping gel extending between the deflectable end of the cantilever beam and the stationary member for damping movement of said inertial member.

9. The accelerometer of claim 8 wherein said self contained viscous damping gel is a silicone.

10. In an accelerometer of the type having a stationary member and a cantilever beam having a deflectable end and means for detecting movement of the deflectable end relative to the stationary member, the improvement which comprises:
    a self contained viscous gel extending between the deflectable end of the cantilever beam and the stationary member for damping movement of said inertial member gel of a type which cures in place to form a cushioning resilient gel-like mass that adheres to the stationary member.

11. The accelerometer of claim 10 wherein the deflectable end of the cantilever beam includes a depending leg extending toward the stationary member with a portion of the leg immersed in the self contained viscous gel.

12. The accelerometer of claim 11 wherein the depending leg is immersed in the self contained viscous gel to a depth of from 0.004 to 0.005 inches.

13. The accelerometer of claim 12 wherein said self contained viscous gel is a silicone gel of a type which cures in place to form a cushioning, resilient gel-like mass which adheres to the stationary member.

* * * * *